June 4, 1968  C. J. WEISBECKER  3,386,120
STRAND WIPING APPARATUS
Filed Jan. 21, 1966
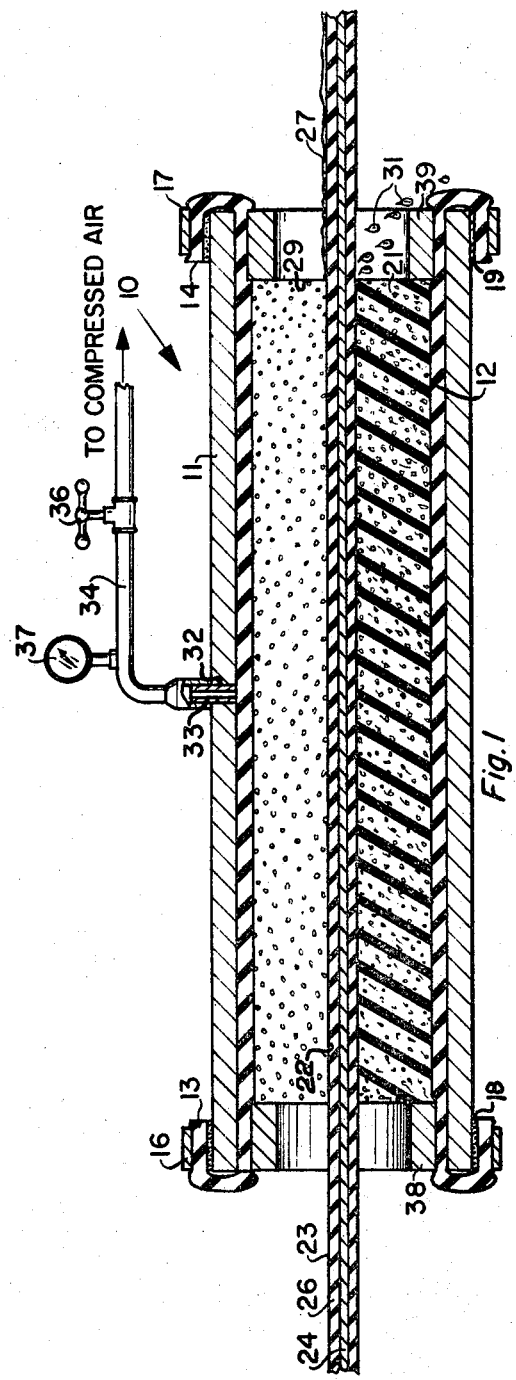
INVENTOR.
CHARLES J. WEISBECKER
BY  V. F. Volk
HIS AGENT

United States Patent Office 3,386,120
Patented June 4, 1968

3,386,120
STRAND WIPING APPARATUS
Charles J. Weisbecker, Orange, Calif., assignor to Anaconda Wire and Cable Company, a corporation of Delaware
Filed Jan. 21, 1966, Ser. No. 522,275
8 Claims. (Cl. 15—210)

ABSTRACT OF THE DISCLOSURE

A wiper to remove the cooling water from insulated wire issuing from an extruder is comprised of a split cylinder of cellular material within a rigid casing. The casing is lined with rubber tubing, and pressurized air is introduced between the tubing and the casing wall to compress the cellular material around the insulated wire.

---

My invention relates to strand wipers and particularly to wipers for removing cooling water from insulated conductors.

In the manufacture of electrical conductors it is customary to extrude a hot plastic insulating material over a metal wire and continuously to cool and harden the plastic by passing the insulated wire through a water trough. Before the insulated wire is taken up on a reel, however, the water must be removed, and for this purpose the wet conductors are usually passed through air wipers, which blow a constant stream of compresesd air against the wire surface. This practice is wasteful of compressed air, however, and it is very noisy. On the other hand, it has not been commercially practicable to wipe off the water by passing the insulated conductors through dies for, if the dies are hard, lumps and lengths of oversized strand will jam and break, and if the dies are resilient they wear rapidly, for it must be considered that the strands pass through the cooling troughs continuously at rates of 1000 feet per minute and greater. A worn die is useless for as soon as it becomes oversize a water film will remain on the strands that are passed through.

It has been proposed to use resilient wipers that are weighted or compressed by springs to compensate for wear. But the compression of such wipers has never been radial with the result that they left streaks of water on the strands.

I have invented a wiper that maintains a constant radial pressure around the circumference of a strand even though the wiping surface is worn down by abrasion. The surface of my wiper that wears out is easily and cheaply replaced, and my wiper can accommodate a range of strand sizes and variations in size, and also pass lumps in the strand without danger of breaking.

The apparatus that I have invented for wiping an advancing strand comprises a rigid tubular member and a length of flexible elastic tubing, such as rubber tubing, concentrically positioned within the member. The ends of the tubing are sealed to the rigid tube so that the elastic tubing and the rigid member combine to form an annular chamber with the length of tubing between the ends being free to expand inwardly under fluid pressure. My apparatus comprises a cylinder, which may be split, of compressible cellular material, such as cellular rubber, concentrically positioned within the tubing. The cells of the cellular material are closed cells and the cylinder comprises a central lengthwise bore fitting the strand. An aperture through the wall of the tubular member admits pressurized fluid, such as air, into the chamber and there are means connecting this aperture to a source of the pressurized fluid. Preferably my apparatus comprises means to control the pressure in the chamber, and I may mount a plurality of my wiping apparatuses in tandem.

A more thorough understanding of my invention may be gained from a study of the appended drawing.

In the drawings:

FIGURE 1 shows a lengthwise section of the apparatus of my invention.

FIGURE 2 shows an apparatus with the apparatuses of FIGURE 1 in tandem.

In my wiper, indicated generally by the numeral 10, a metal tubular member 11 is lined with a length of rubber tubing 12 which may, of course, be neoprene, Thiokol or other elastic material and the word "rubber" is used in this application to include such materials. The ends of the tubing 12 are folded back around the member 11 to form overlaps 13, 14 which are sealed down by hose clamps 16, 17. The connection of the tubing 12 to the member 11 should be airtight and for this reason I have applied coatings 18, 19 of cement between the overlaps 13, 14 and the tubular member 11. Within the tubing 12 I have positioned a cylinder 21 of cellular rubber. Other compressible materials may also be used for the cylinder 21 within the scope of my invention but it is important that they should not be spongy in the sense of having interconnecting cells that can fill with water so that the whole cylinder becomes soggy. The cylinder 21 has a bore 22 fitting an insulated conductor, or strand 23 comprising a wire 24 and an annular wall of insulation 26. The conductor 23 has just passed through the cooling trough (not shown) of a plastic extruder (also not shown) so that it is covered with an irregular film of water 27. The film 27 is removed by a leading edge 29 of the cylinder 21 and forms into droplets 31 that flow into discard. If the cylinder 21 were spongy, with interconnecting cells, it would soon become soaked, and the conductor leaving the cylinder would have a film of water. In order to press the cylinder 21 against the strand 23 the member 11 has an aperture 32 fitted with a nozzle 33. The aperture 32 opens into the area between the tubing 12 and member 11. The nozzle 33 is connected to a hose or pipe 34 leading to a source of compressed air, not shown. The compressed air serves to expand the tubing 12 inwardly compressing the cylinder 21 against the strand 23. It is convenient to use compressed air for this purpose but other pressurized fluids such as oil or water may also be used within the scope of my invention. The pressure is regulated by means of a valve 36 in the pipe 34 and is indicated on a gage 37. The cyilnder 21 is blocked in by tight-fitting ring inserts 38, 39 that serve also to prevent the air pressure from expanding the tubing 12 endwise.

Under many conditions a single apparatus 10 will remove essentially all the water from an advancing strand. However, for extra high-speed strands, I have preferred to use a plurality of my apparatuses in tandem as shown in FIGURE 2. Here the wipers 10 are spaced apart a distance between one inch and one foot which I have found results in the most efficient wiping. I have shown each wiper with its individual valve and gage but they may all be fed from a manifold with a single valve and gage within the scope of my invention. The former method has the advantage that the pressure can be set in each wiper to compensate for the individual degree of wear of the cylinder 21, as will be explained hereinbelow.

In the practice of my invention my apparatus is mounted at the downstream end of the cooling trough of an extruder. For high speed operation three of the wipers 10 are mounted in tandem with a six-inch space between them, and the strand is threaded through the bores 22. I have also found it advantageous to use split cylinders for the cylinders 21 where the split is lengthwise so that the cylinders can be fitted over a strand when the end of the strand is not available. This has the advantage that the cylinders 21 can be replaced during operation without cutting the strand, but I have found that with cylinders having a wall thickness of ⅜ inch and greater the rate of wear is such that they will not require replacement during continuous operation for a plurality of strand lengths where the length is determined by the quantity of the wire 24 on a pay-off spool into an extruder.

The valves 36 are opened until the pressure over the tubings 12 is 12 p.s.i. and the quantity of water that remains on the strand after it leaves the apparatus is inspected visually. If the water film is not completely removed either because the bore 22 is originally somewhat oversize or because of wearing away of the cellular substance of the cylinder, the air pressure is increased by manually operating the valves 36 until a satisfactory wiping action is achieved. I have found that my apparatus performs most satisfactorily at air pressures between 12 and 40 p.s.i.

The embodiments of my invention that have been described are exemplary rather than definitive and my invention will comprise other embodiments defined by the following claims.

I claim:
1. Apparatus for wiping an advancing strand comprising:
   (A) a rigid tubular member,
   (B) a length of flexible elastic tubing
      (a) concentrically positioned within said member,
      (b) the ends of said length of tubing being sealed to said member,
      (c) said tubing and said member combining to form an annular chamber, and
      (d) said length of tubing between the ends thereof being free to expand inwardly under fluid pressure,
   (C) a cylinder of compressible cellular material concentrically positioned within said length of tubing and separating said tubing from any contact with said strand,
      (a) said cylinder comprising a central lengthwise bore fitting said strand, and
      (b) said cellular material comprising closed cells,
   (D) an aperture through the wall of said tubular member admitting pressurized fluid into said chamber, and
   (E) means connecting said aperture to a source of pressurized fluid.

2. The apparatus of claim 1 wherein said cylinder is comprised of cellular rubber.
3. The apparatus of claim 1 wherein said cylinder is split.
4. The apparatus of claim 1 wherein said tubing is rubber.
5. The apparatus of claim 1 wherein said fluid is air.
6. The apparatus of claim 1 comprising means controlling the pressure of said fluid within said chamber.
7. Apparatus comprising a plurality of the apparatuses of claim 1 mounted in tandem.
8. The apparatus of claim 7 comprising means controlling the pressure of said fluid within the chambers.

References Cited

UNITED STATES PATENTS

| | | | |
|---|---|---|---|
| 1,586,923 | 6/1926 | Townsend | 15—210.2 X |
| 2,190,376 | 2/1940 | Daley | 15—244.1 |
| 2,192,805 | 3/1940 | Seamark | 15—210.2 X |
| 2,193,887 | 3/1940 | Seeley | 118—405 X |
| 2,255,154 | 9/1941 | Esposito | 15—256.6 |
| 3,142,855 | 8/1964 | Gilchrist | 15—244 X |

CHARLES A. WILLMUTH, *Primary Examiner.*

L. G. MACHLIN, *Assistant Examiner.*